US009456133B2

United States Patent
Yang

(10) Patent No.: US 9,456,133 B2
(45) Date of Patent: Sep. 27, 2016

(54) IMAGE SHOOTING UNIT AND APPARATUS, INTEGRATED DISPLAY AND IMAGE SHOOTING APPARATUS, AND IMAGE SHOOTING METHOD

(71) Applicant: Huawei Technologies Co., Ltd., Shenzhen (CN)

(72) Inventor: Haiyao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/583,361

(22) Filed: Dec. 26, 2014

(65) Prior Publication Data
US 2015/0116532 A1    Apr. 30, 2015

Related U.S. Application Data

(63) Continuation of application No. PCT/CN2013/073849, filed on Apr. 8, 2013.

(30) Foreign Application Priority Data

Jun. 28, 2012  (CN) .......................... 2012 1 0218324

(51) Int. Cl.
H04N 5/232 (2006.01)
H04N 5/225 (2006.01)
(Continued)

(52) U.S. Cl.
CPC ........... H04N 5/23229 (2013.01); G03B 11/00 (2013.01); G03B 11/045 (2013.01);
(Continued)

(58) Field of Classification Search
CPC .. G03B 11/045; G03B 11/04; H04N 5/2254; H04N 5/23209; H04N 5/232
See application file for complete search history.

(56) References Cited

U.S. PATENT DOCUMENTS 4,454,417 A * 6/1984 May ................... G06F 3/03542
250/216
2009/0141361 A1 6/2009 Yamagata et al.
(Continued)

FOREIGN PATENT DOCUMENTS

CN    1860780 A    11/2006
CN    1897648 A    1/2007
(Continued)

OTHER PUBLICATIONS

Partial English Translation and Abstract of Chinese Patent Application No. CN101765020A, Jan. 29, 2015, 3 pages.
(Continued)

*Primary Examiner* — Tuan Ho
(74) *Attorney, Agent, or Firm* — Conley Rose, P.C.; Grant Rodolph

(57) ABSTRACT

The image shooting unit is configured to collect image information, and a formed image is a pixel block including one or several pixels, and the image shooting unit includes a tubular directional hood, a lens group, and a light sensitive module that are arranged sequentially along a light incidence direction and a same optical axis, where the tubular directional hood eliminates non-parallel light signals entering the tubular directional hood and enables parallel light signals parallel to an axis of the tubular directional hood to pass; the lens group converges, onto the light sensitive module, the parallel light signals passing through the tubular directional hood; and the light sensitive module converts the parallel light signals into electrical signals.

20 Claims, 11 Drawing Sheets

(51) Int. Cl.
  *G03B 11/04* (2006.01)
  *H04N 5/357* (2011.01)
  *H04N 5/369* (2011.01)
  *H04N 7/14* (2006.01)
  *G03B 11/00* (2006.01)

(52) U.S. Cl.
  CPC .......... *H04N5/2254* (2013.01); *H04N 5/2258* (2013.01); *H04N 5/3572* (2013.01); *H04N 5/3696* (2013.01); *H04N 7/144* (2013.01)

(56) References Cited

U.S. PATENT DOCUMENTS

| | | |
|---|---|---|
| 2011/0122281 A1 | 5/2011 | Ohara et al. |
| 2011/0298953 A1 | 12/2011 | Nakamura |
| 2012/0112254 A1 | 5/2012 | Nagano |
| 2012/0140342 A1 | 6/2012 | Tsai |

FOREIGN PATENT DOCUMENTS

| | | |
|---|---|---|
| CN | 101765020 A | 6/2010 |
| CN | 102271219 A | 12/2011 |
| CN | 102468314 A | 5/2012 |

OTHER PUBLICATIONS

Foreign Communication From a Counterpart Application, PCT Application No. PCT/CN2013/073849, English Translation of International Search Report dated Jul. 18, 2013, 2 pages.

Foreign Communication From a Counterpart Application, PCT Application No. PCT/CN2013/073849, English Translation of Written Opinion dated Jul. 18, 2013, 7 pages.

Foreign Communication From a Counterpart Application, Chinese Application No. 201210218324.3, Chinese Office Action dated Feb. 3, 2016, 11 pages.

\* cited by examiner

IMAGE SHOOTING UNIT AND APPARATUS, INTEGRATED DISPLAY AND IMAGE SHOOTING APPARATUS, AND IMAGE SHOOTING METHOD

CROSS-REFERENCE TO RELATED APPLICATION

This application is a continuation of International Application No. PCT/CN N2013/073849, filed on Apr. 8, 2013, which claims priority to Chinese Patent Application No. 2012/0218324.3, filed on Jun. 28, 2012, both of which are hereby incorporated by reference in their entireties.

TECHNICAL FIELD

The present invention relates to the display field, and in particular, to an image shooting unit, an image shooting apparatus, and an integrated display and image shooting apparatus, and an image shooting method and a video image processing method.

BACKGROUND

A mobile phone camera generally includes various components such as a plastic or glass lens, a pupil device, a baffle device, a drive, a lens holder, a cylinder, a light filter, and an image sensor, and these components are independently manufactured and are assembled into a mobile phone. To meet market requirements and reduce manufacturing and packaging costs, mobile phone manufacturers consider use of a wafer-level camera manufacturing technology. In such a wafer-level camera manufacturing technology, all components are manufactured and packaged at a wafer level using a standard semiconductor technology, where optical wafers and complementary metal-oxide-semiconductor (CMOS) wafers are manufactured, the optical wafers and the CMOS wafers are stacked, and finally the stacked wafers are cut into camera modules.

It is well known that, a pixel is an important indicator for measuring a camera, the number of pixels depends on the number of light sensitive elements on an image sensor, and one light sensitive element corresponds to one pixel. Based on this, a smaller pixel size (an area of a single light sensitive element) on an image sensor indicates a higher corresponding resolution. However, in a micro case, this does not follow laws of optics. Reducing a pixel size on an image sensor under the premise of not deteriorating performance or image quality cannot be achieved, and this is because shrinking a light sensitive element deteriorates a light collection capability, and as a result, a smaller pixel collects fewer photons, which inevitably causes more photon noise and deteriorates imaging quality; in addition, when an optical device is shrunk, correspondingly, a diameter of a lens becomes smaller, and a focal length becomes shorter, and for a same light collection capability, a spot size restricted by diffraction does not depend on a lens diameter size, and therefore when a size of the lens is very small, the number of distinguishable image points greatly decreases, which also causes deterioration of the imaging quality; and in addition, when the optical device is shrunk, the light collection capability deteriorates, and to ensure the imaging quality, the diameter of the lens needs to be increased, a lens dent depth needs to be increased, and a focus depth needs to be decreased, and more lenses are required to correct optical distortion, which causes a decrease of a yield of cameras.

In conclusion, an existing image shooting apparatus generally uses a small pixel size, an area of a single light sensitive element is reduced as far as possible, and the foregoing problems are inevitably caused inside the image shooting apparatus, affecting imaging quality and costs. In addition, the exiting image shooting apparatus generally uses whole body imaging on a single light sensitive surface, and it is difficult to eliminate dispersion and aberration phenomena, which also affects imaging quality.

SUMMARY

Objects of the present invention are to provide an image shooting unit, an image shooting apparatus, and an integrated display and image shooting apparatus, and an image shooting method and a video image processing method, which can improve imaging quality and reduce impacts of dispersion and aberration phenomena on imaging.

To achieve the foregoing objectives, embodiments of the present invention use the following technical solutions:

An embodiment of the present invention provides an image shooting unit that performs collection based on pixels, where the image shooting unit is configured to collect image information, a formed image is a pixel block including one or several pixels, and the image shooting unit includes a tubular directional hood, a lens group, and a light sensitive module that are arranged sequentially along a light incidence direction and a same optical axis, where the tubular directional hood eliminates non-parallel light signals entering the tubular directional hood and enables parallel light signals parallel to an axis of the tubular directional hood to pass; the lens group converges, onto the light sensitive module, the parallel light signals passing through the tubular directional hood; and the light sensitive module converts the parallel light signals into electrical signals.

An embodiment of the present invention further provides an image shooting apparatus, including multiple image shooting units described above, where the image shooting units are arranged in an array manner to form an N×M image shooting array, both N and M are non-zero natural numbers, each image shooting unit uses its respective tubular directional hood to shoot a scene block in a shot scene, each scene block independently forms an image, the scene blocks shot by the multiple image shooting units are combined to form a complete image, and each scene block corresponds to one or several pixels in the complete image.

An embodiment of the present invention further provides a video image processing method, including two content parts A and B that are concurrently executed:

A: acquiring image information using image shooting units of an integrated display and image shooting apparatus, and sending the acquired image information to an external device; and B: receiving to-be-displayed image information sent by an external device, converting the received to-be-displayed image information into display drive signals, and loading the display drive signals to display units of the integrated display and image shooting apparatus, where the display units display images according to the display drive signals.

According to the image shooting unit, the image shooting apparatus, and the integrated display and image shooting apparatus, the image shooting method, and the video image processing method in the embodiments of the present invention, parallel light signals of a shot scene are collected through tubular directional hoods to obtain an image of each scene block in the shot scene, so as to form a complete image by means of combination, where an image shot by each image shooting unit corresponds to one or several pixels in the complete image. In the embodiments of the present invention, several light sensitive components in a light sensitive module are used to perform sampling on a relatively large optical spot and finally, image information collected by an image shooting unit corresponds to one or several pixels of a formed complete image, which can retain an appropriate light collection capability, so that imaging quality is high. In addition, each scene block independently forms an image, and there is no correlation between scene blocks, and therefore the scene blocks do not have mutual impacts caused by dispersion and aberration phenomena, thereby improving image quality.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show only some embodiments of the present invention, and a person of ordinary skill in the art may still derive other drawings from these accompanying drawings without creative efforts.

DESCRIPTION OF DRAWING MARKS

10—image shooting unit, 11—tubular directional hood, 12—lens group, 13—light sensitive module, 14—signal processing module, 15—signal processing unit, 151—correlation calculation module, 152—normalization module, 16—amplifying unit, 17—analog-to-digital conversion unit, 181—light filtering component, 182—light converging component, 19—light signal generator, 20—display unit, 21—integrated display and image shooting unit, 22—display drive unit, 23—communications unit, 24—adaptation unit, 25—composite unit, 26—compression unit, 27—decoding unit.

DESCRIPTION OF EMBODIMENTS

Embodiments of the present invention provide an image shooting unit, an image shooting apparatus, and an integrated display and image shooting apparatus, an image shooting method, and a video image processing method, which can reduce impacts of dispersion and aberration phenomena on imaging and improve image quality.

The following describes the embodiments of the present invention in detail with reference to accompanying drawings. The specific implementation manners described herein are only used for describing the present invention, but are not intended to limit the present invention.

Embodiment 1

Figure 1:
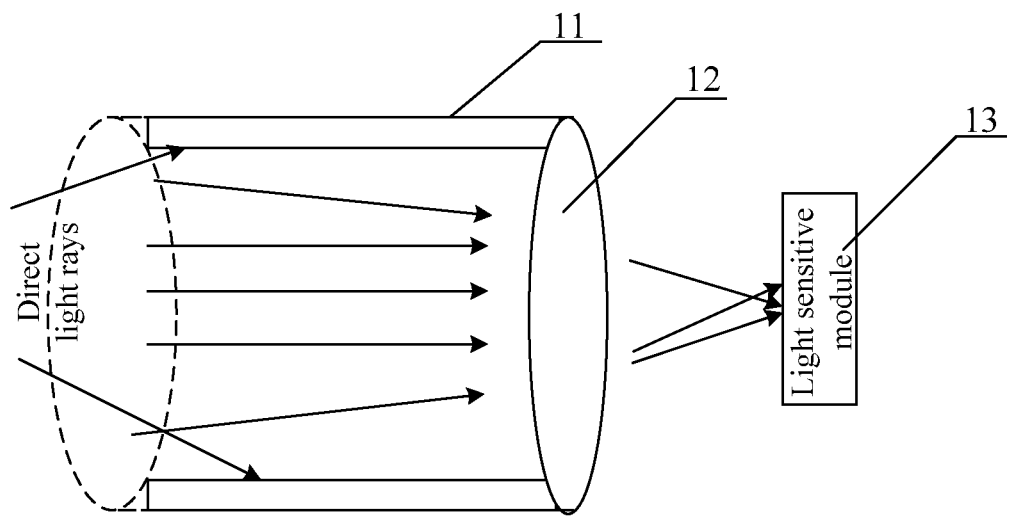
FIG. 1 is a first schematic structural diagram of an image shooting unit according to Embodiment 1 of the present invention.

This embodiment of the present invention provides an image shooting unit that performs collection based on pixels and is configured to collect image information, and a formed image is a pixel block including one or several pixels. As shown in FIG. 1, the image shooting unit includes a tubular directional hood 11, a lens group 12, and a light sensitive module 13 that are arranged sequentially along a light incidence direction and a same optical axis, where the tubular directional hood 11 is configured to eliminate non-parallel light signals entering the tubular directional hood 11 and enable parallel light signals parallel to an axis of the tubular directional hood 11 to pass; the lens group 12 converges, onto the light sensitive module 13, the parallel light signals passing through the tubular directional hood 11; and the light sensitive module 13 converts the parallel light signals into electrical signals.

The tubular directional hood 11 is generally a tubular light ray path, which only a direct light ray (a light ray that is approximately parallel to the axis of the tubular directional hood 11) can directly pass through. There are various specific implementation manners. As an example, a material of the tubular directional hood 11 is a light-absorbing material, or an inner wall of the tubular directional hood 11 is coated with a light-absorbing material, so as to eliminate the non-parallel light signals entering the tubular directional hood. Therefore, when light rays enter a light path, only direct light rays can directly pass, and most of non-parallel light rays (stray light rays/stray light) that deviate from a direction of the axis travel to the inner wall of the tubular directional hood 11 and then are absorbed by the light-absorbing material, which prevents incident stray light rays of other directions from being reflected by the inner wall and projecting on the lens group behind and entering a subsequent light path.

Optionally, a cross section of the tubular directional hood 11 in the embodiment is generally a circle; however, other shapes, such as an oval, a square, and a petal shape, are not excluded.

The lens group 12 in this embodiment converges, onto the light sensitive module 13, the parallel light signals passing through the tubular directional hood 11, and a refractive index of the lens group 12 depends on a distance between the lens group 12 and the light sensitive module 13.

In this embodiment of the present invention, the image shooting unit performs collection based on pixels, and when the image shooting unit is used for shooting a scene, a formed image is a pixel block, where the pixel block includes one or several pixels and corresponds to a scene block in the shot scene. The image shooting unit in this embodiment may serve as a basic unit for forming an image shooting apparatus and during specific implementation, may be generally considered to be integrated into an overall substrate (for example, a silicon substrate). Specific sizes of components, such as the tubular directional hood 11 and the lens group 12, of the image shooting unit may be designed according to an actual situation in a specific application.

Preferably, the image shooting unit is a single-pixel image shooting tube and is configured to collect one piece of pixel information.

The image shooting unit in this embodiment of present invention uses one tubular directional hood 11 to obtain parallel light by means of filtering and block other non-parallel light rays to reduce interference of other stray light and diffraction interference of other light beams and obtain an image of a small scene block in an external scene, may serve as a basic unit for forming an image shooting apparatus, and is configured to collect one or several pixels.

Further, as shown in FIG. 1, the lens group 12 is stuck against a light signal outgoing end of the tubular directional hood 11, and the tubular directional hood 11 encircles an edge of the lens group 12 to form a tubular light ray path that can block light rays outside the tubular directional hood 11 and enable parallel light signals passing through the axis of the tubular directional hood 11 to enter a subsequent light path for imaging.

Optionally, the light sensitive module 13 includes several light sensitive components, and the light sensitive components are arranged in an array manner to form a light sensitive dot matrix. Further, optionally, a light sensitive component may be a CMOS component or a charge-coupled device (CCD) or another type of optical-to-electrical conversion component. The light sensitive dot matrix can be arranged in various manners, which is not limited herein by this embodiment.

The image shooting unit in this embodiment of the present invention uses one tubular directional hood 11 to obtain parallel light by means of filtering and block other non-parallel light rays to reduce interference of other stray light waves. A lens group 12 is used to form an image on a light sensitive module 13. The light sensitive module 13 includes multiple light sensitive components, and the multiple light sensitive components perform sampling on a relatively large optical spot. Signals collected by the light sensitive module 13 of one image shooting unit correspondingly form a pixel block including one or several pixels, where a light collection capability is appropriate and imaging quality is high. The image shooting unit may serve as a basic unit for forming an image shooting apparatus and is extremely widely used in the image shooting and display field.

Embodiment 2

Figure 2:
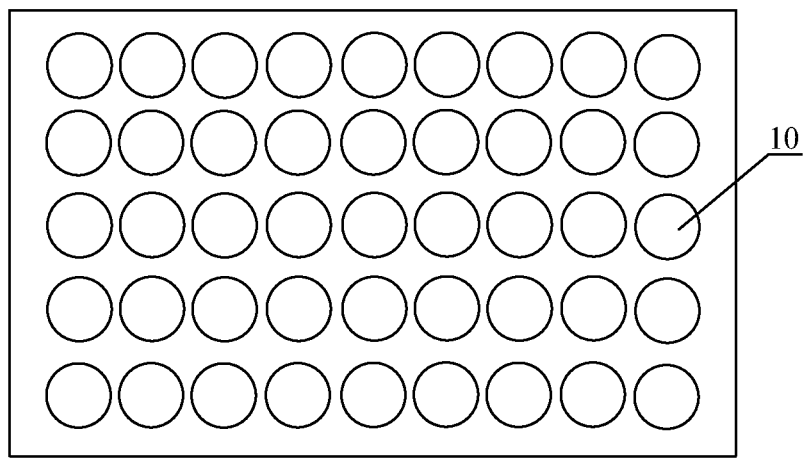
FIG. 2 is a schematic structural diagram of an image shooting apparatus according to Embodiment 2 of the present invention.

This embodiment of the present invention provides an image shooting apparatus, as shown in FIG. 2, including multiple image shooting units 10 according to Embodiment 1, where the image shooting units 10 are arranged in an array manner to form an N×M image shooting array, both N and M are non-zero natural numbers, each image shooting unit 10 uses its respective tubular directional hood to shoot a scene block in a shot scene, each scene block independently forms an image, the scene blocks shot by the multiple image shooting units are combined to form a complete image, and each scene block corresponds to one or several pixels in the complete image.

It should be noted that, FIG. 2 is only one type of array arrangement of the image shooting units, and this embodiment does not impose limitations on a specific array arrangement manner of the image shooting units.

Figure 3:
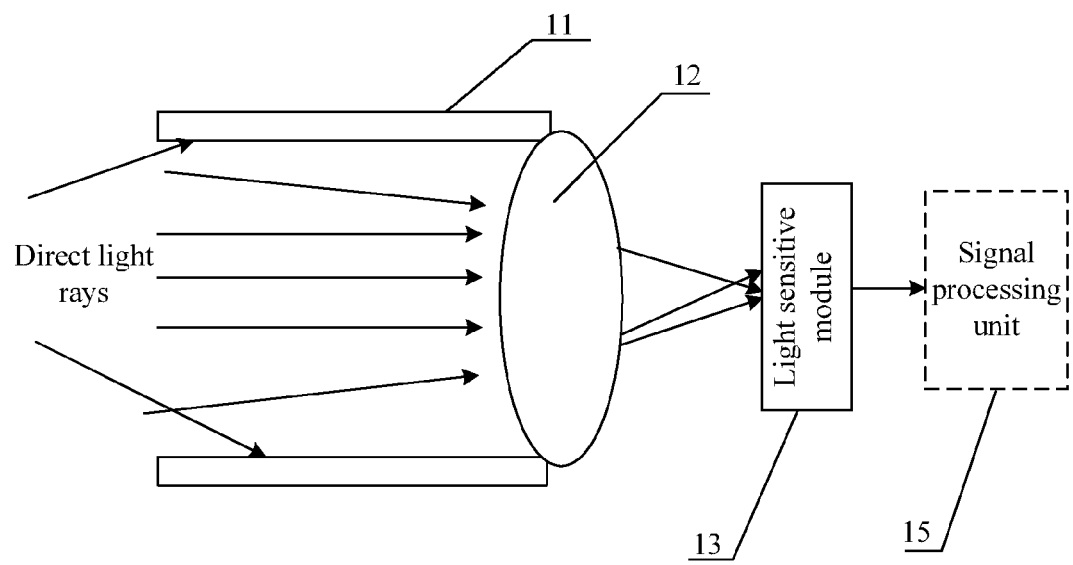
FIG. 3 is a schematic structural diagram of an image shooting unit of an image shooting apparatus according to Embodiment 2 of the present invention.

The image shooting unit 10, as shown in FIG. 3, includes a tubular directional hood 11, a lens group 12, and a light sensitive module 13 that are arranged sequentially along a light incidence direction and a same optical axis.

In this embodiment of the present invention, the image shooting apparatus uses multiple image shooting units that collect parallel light signals, and each image shooting unit can shoot only a scene block of a same size as an aperture of the image shooting unit due to existence of a tubular directional hood 11. As a result, a shot scene is divided into several scene blocks and signal collection is performed on the shot scene by scene block. Each scene block independently forms an image, and there is no overlapping area between scene blocks collected by adjacent image shooting units. Parallel light signals (an image formed by a scene block in a corresponding image shooting unit, that is, an obtained pixel block) collected by each image shooting unit are stored as one or several pixels, and when the pixel information is displayed again, pixels are combined, according to a predetermined arrangement, into a complete image for playing by frame.

Each image shooting unit shoots only a scene block of a same size as an aperture of the image shooting unit, but not an entire shot scene. Therefore, a light sensitive module (including several image sensors) are configured to perform sampling on a relatively large optical spot, a light collection capability is retained at an appropriate value, and a focal depth is high, not requiring more lenses to correct optical distortion. Therefore, a lens group has a small number of lenses and a simple structure.

Preferably, the parallel light signals collected by each image shooting unit are stored as one piece of pixel information, and the scene block, of a same size as the aperture of the image shooting unit, shot by each image shooting unit, actually serves as one pixel in the shot scene. In consideration of image shooting resolution, the image shooting unit needs to be miniaturized. For example, the image shooting unit may be at a wafer level, and a manufacturing process is roughly similar to that of a wafer-level camera; however, a pixel size (an area of a single light sensitive element) in each image shooting unit does not need to reach a micron level and is much greater than a pixel size in a wafer-level camera, which does not affect imaging quality.

For whole body imaging in the prior art, one light sensitive component/light sensitive point is one pixel, and signals collected by one light sensitive component correspond to one pixel in an image. However, for the image shooting apparatus in this embodiment, signal collection is performed on a shot scene by scene block, several light sensitive components of a light sensitive module perform sampling on a relatively large optical spot, a scene block shot by each image shooting unit finally forms one or several pixels in a complete image correspondingly, and a light collection capability is retained at an appropriate value. This is completely different from that in the prior art, a focal depth is high, a structure is simple, each scene block independently forms an image, there is no correlation between scene blocks, and the scene blocks do not have mutual impacts caused by dispersion and aberration phenomena, thereby improving image quality.

Figure 4:
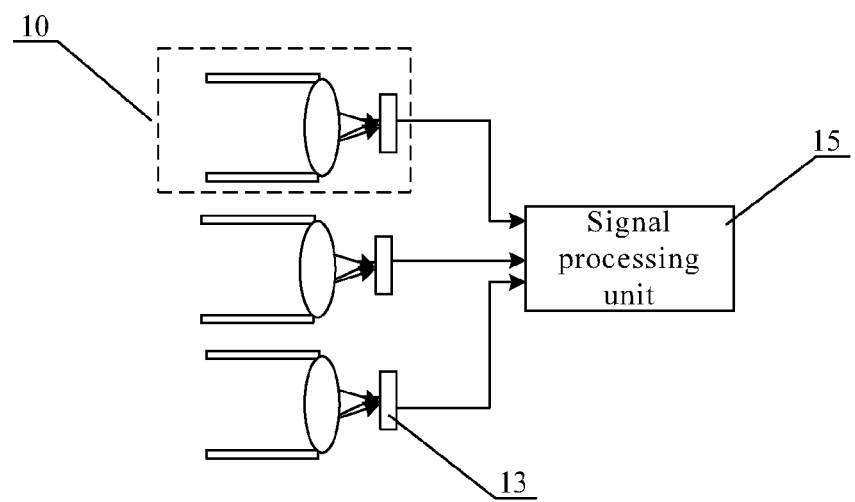
FIG. 4 is a first schematic diagram of an internal structure of an image shooting apparatus according to Embodiment 2 of the present invention.

Further, as shown in FIG. 3, the image shooting apparatus in this embodiment of the present invention further includes at least one signal processing unit 15 configured to filter electrical signals output by light sensitive points on the light sensitive module to obtain electrical signals corresponding to direct parallel light, and convert the obtained electrical signals corresponding to the direct parallel light into one or more pixels, where one signal processing unit 15 is connected to the light sensitive modules of multiple image shooting units, and the multiple image shooting units share the one signal processing unit, as shown in FIG. 4; or optionally, one signal processing unit 15 is connected to the light sensitive module of one of the multiple image shooting units.

In this embodiment, a direct parallel light signals refer to light rays that are approximately parallel to an axis of the tubular directional hood 11 and can pass though the tubular directional hood 11 and directly arrive at the lens group 12 and the light sensitive module 13, and are hereinafter referred to as direct light.

Light waves with different amplitudes fall at different light sensitive points on the light sensitive module 13 and form electrical signals with different amplitudes on the different light sensitive points by means of optical-to-electrical conversion. The signal processing unit 15 in this embodiment is configured to process electrical signals output by the light sensitive module 13 and obtain the direct parallel light signals (direct light signals) by means of filtering according to differences of falling point locations of the direct light in a light sensitive dot matrix and corresponding amplitudes of electrical signals formed in different falling point locations, which further reduces interference of stray light.

Figure 5:
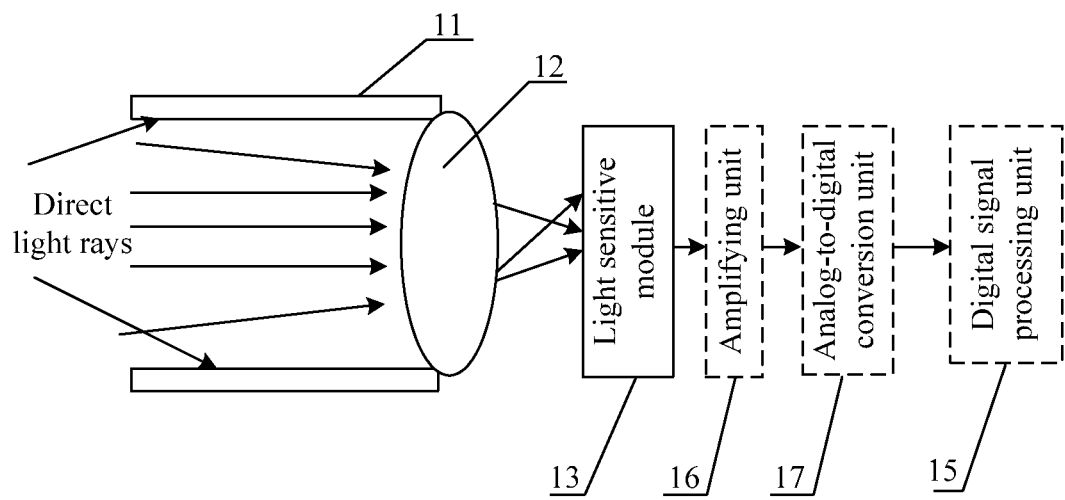
FIG. 5 is a second schematic diagram of an internal structure of an image shooting apparatus according to Embodiment 2 of the present invention.

Optionally, as shown in FIG. 5, the image shooting apparatus further includes an amplifying unit 16, connected to the light sensitive module 13, and configured to amplify the electrical signals output by the light sensitive module 13; and an analog-to-digital conversion unit 17, connected to the amplifying unit 16, and configured to convert amplified electrical signals into digital signals by means of sampling, where the signal processing unit 15 is a digital signal processing unit, is connected to one or several analog-to-digital conversion units, and is configured to perform correlation calculation on digital signals output by the analog-to-digital conversion unit 17, obtain by means of filtering, according to a result of the correlation calculation, electrical signals corresponding to direct parallel light, and convert the obtained electrical signals corresponding to the direct parallel light into one or several pixels.

The amplifying unit 16, the analog-to-digital conversion unit 17, and the digital signal processing unit 15 may be integrated to form a signal processing unit or may independently form components, to coordinate with each other to implement signal conversion and processing functions. No matter which manner is used in specific implementation, a specific working process is roughly similar.

As described above, integrating the amplifying unit 16 and the analog-to-digital conversion unit 17 into the digital signal processing unit 15 is only a specific implementation manner of this embodiment of the present invention. Besides, in specific implementation, optionally, the amplifying unit 16 and the analog-to-digital conversion unit 17 may also be disposed at one side close to the light sensitive module 13 to independently form components (or the amplifying unit 16 and the analog-to-digital conversion unit 17 are integrated to form one component), or be integrated into the light sensitive module 13 to mutually coordinate with the light sensitive module 13 to jointly implement a light signal conversion function. In this case, the signal processing unit 15 is a digital signal processing unit. No matter which manner is used, a specific working process is similar, not affecting an implementation effect of the present invention.

Figure 6:
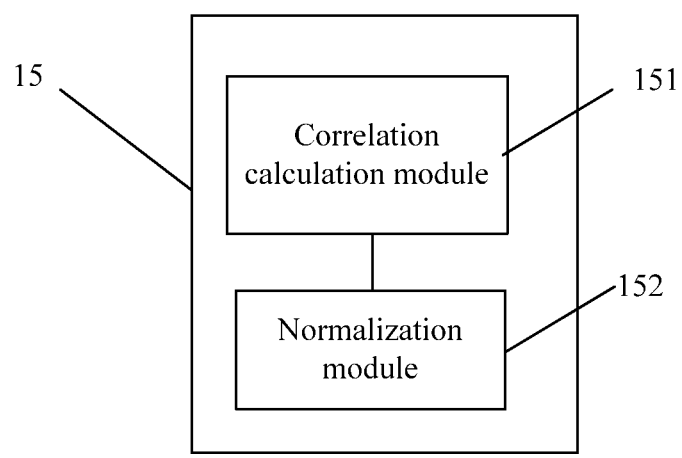
FIG. 6 is a structural block diagram of a signal processing unit according to Embodiment 2 of the present invention.

As shown in FIG. 6, the signal processing unit 15 includes a correlation calculation module 151 configured to perform correlation calculation on the electrical signals output by the light sensitive points on the light sensitive module 13, and filtering, according to a result of the correlation calculation, electrical signals corresponding to parallel light received by the light sensitive module to obtain electrical signals corresponding to direct parallel light; and a normalization module 152 configured to convert, by means of normalization processing, the obtained electrical signals corresponding to the direct parallel light into one or several pixels.

Based on the foregoing structure description, the following describes in detail a specific signal processing process of the signal processing unit.

When the image shooting unit faces a certain direction, direct light directly passes through a light path, arrives at the lens group 12, and finally converges on the light sensitive module 13 to form optoelectronic signals. Most (95%) of stray light is absorbed by a light-absorbing material on a wall of the tubular directional hood 11 when it passes through the light path because the incidence angle is not 100% perpendicular, and does not arrive at a lens by reflection or then enter the subsequent light sensitive module 13; and the rest (less than 5%) of the stray light arrives at the light sensitive module 13 together with the direct light after being converged by the lens group. The direct light and the stray light mix together on the light sensitive module 13, and signal strength of light waves forms light signal strength and amplitude curves shown in FIG. 7A. The amplitude curve is similar to a stereo waveform in a straw hat shape. In a location (an optical axis center area) close to an axis center point, there is a light amplitude peak similar to a terrace;

outside the optical axis center area, there is an area (an attenuation area) in which a light signal amplitude decreases sharply; and then in a location close to an outer edge, there is an area (a flat area) in which a light wave amplitude decreases slowly. FIG. 7B shows a specific falling point correspondence on the light sensitive module.

The optical axis center area is a center area at which the direct light arrives. Most of the direct light falls in this light sensitive area, and optical-to-electrical conversion is performed in this light sensitive area. A wave form amplitude (a light wave amplitude) of this area is the largest, and this area is similar to the top of a straw hat.

The attenuation area is an area in which a small part of the direct light and some stray light, and most of dispersive light derived from the direct light falls. A longer distance from the center area indicates larger waveform amplitude attenuation in this area. This area forms a relatively sharp decrease attenuation area that is similar to a hat wall, facing down, of the straw hat.

The flat area is a light sensitive area in which the stray light, the dispersive light derived from the direct light, and the like mainly fall. Basically, the direct light is not included. This area is relatively far away from the center area, and a light wave amplitude forms a relatively flat attenuation area that is similar to a sun-shade hat brim of the straw hat.

Figure 7A:
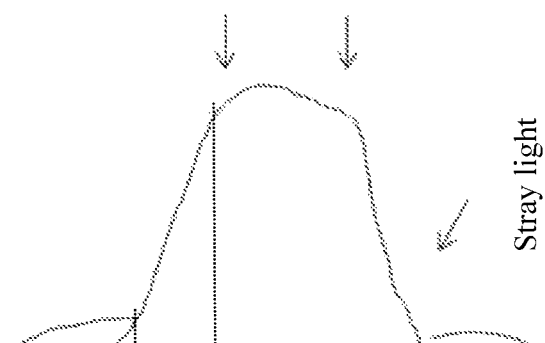
FIG. 7A is a schematic diagram of strength and amplitude curves of light signals received by a light sensitive module according to Embodiment 2 of the present invention.
Figure 7B:
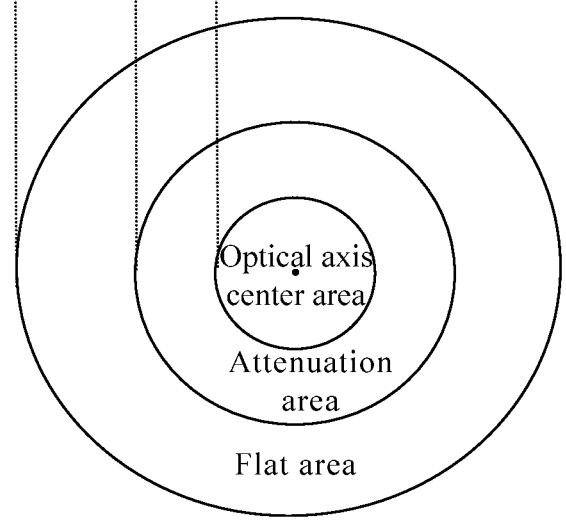
FIG. 7B is a schematic diagram of corresponding falling points on a light sensitive dot matrix of the light sensitive module.

As shown in FIGS. 7A-7B, light signals form electrical signals with different amplitudes at different light sensitive points of the light sensitive module 13 by optical-to-electrical conversion. Specific falling point areas of corresponding light signals on the light sensitive module 13 are as follows: in the optical axis center area, more than 95% of the direct light energy is concentrated, and the rest of less than 5% of light energy is other stray light waves or dispersive light. After optical-to-electrical conversion, data obtained by sampling in this area has a great spatial correlation. The spatial correlation refers to that data, obtained after sampling is performed on adjacent light sensitive points, representing optical characteristics such as brightness and chrominance of light, is relatively consistent, and no jumping abrupt change occurs, or, no discrete distribution emerges. In the attenuation area, a longer distance from the center area indicates larger waveform amplitude attenuation. In addition, when the distance from the center area becomes longer, a correlation of data obtained by sampling gradually decreases, and an increasingly large stray distribution of data in space gradually emerges. The light wave amplitude in the flat area forms a relatively flat attenuation area, and therefore a spatial correlation of data obtained by sampling is also relatively small. Therefore, which is direct light and which is interferential light such as stray light and dispersive light can be easily determined using brightness (waveform amplitudes of light) and spatial correlations of data obtained by sampling.

Light signals form electrical signals with different amplitudes at different light sensitive points of the light sensitive module 13 by optical-to-electrical conversion. Digital signals obtained after the analog-to-digital conversion unit 17 performs sampling on electrical signals output by the light sensitive module 13 of one of the multiple image shooting units correspond to light sensitive locations of the light sensitive module 13, and the data may be recorded using an array.

Figure 8:
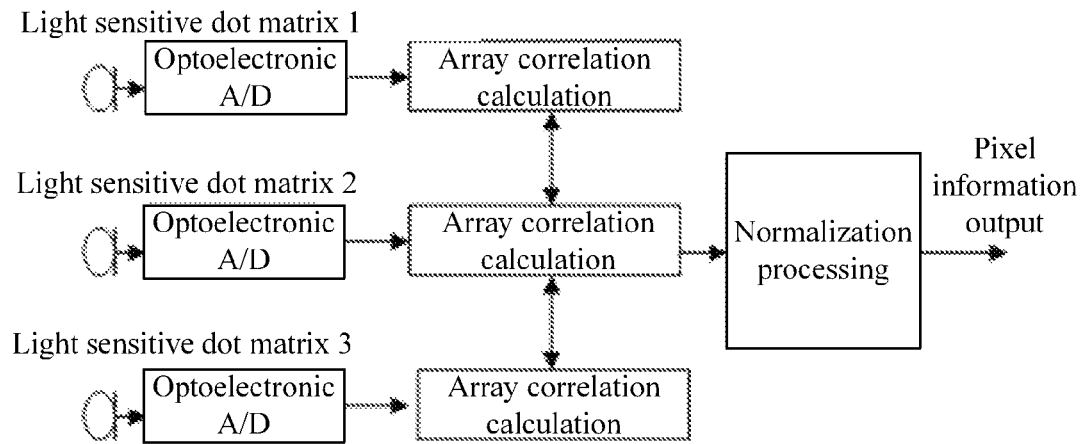
FIG. 8 is a schematic flowchart of signal processing according to Embodiment 2 of the present invention.

Digital signals converted by the analog-to-digital conversion unit 17 from the data collected by the light sensitive module 13 are input to the signal processing unit (digital signal processing unit) 15. The correlation calculation module 151 of the signal processing unit 15 marks out the optical axis center area, the attenuation area, and the flat area using differences of spatial falling point locations of these signals and signal amplitudes corresponding to the falling point locations, and then determines, with reference to the correlations, which is direct light and which is interferential light such as stray light and dispersive light. Data of stray light signals needs to be eliminated, so as to prevent interference of the stray light. For signal data collected by a same image shooting unit, the correlation calculation module 151 further performs array correlation calculation to eliminate impacts of dispersion and aberration on an image formed by the image shooting unit. The normalization module 152 of the signal processing unit 15 is configured to perform, by performing an array operation, normalization on data of direct light signal that is finally obtained by means of filtering, to obtain a data signal output of one pixel (or several pixels), as shown in FIG. 8.

In this embodiment, many correlation calculation and normalization operation algorithms are involved. A processing manner used during specific calculation belongs to the prior art and can be easily figured out by a person skilled in the art within the technical scope disclosed in the present invention, and details are not repeatedly described herein.

Figure 9:
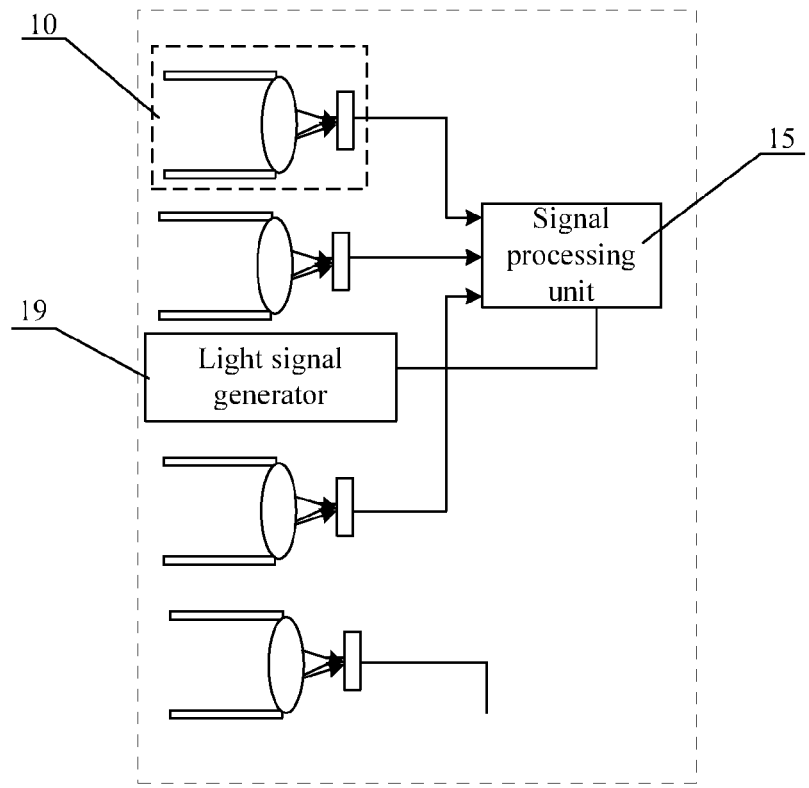
FIG. 9 is a first schematic structural diagram of an image shooting apparatus with an in-depth image shooting function according to Embodiment 2 of the present invention.
Figure 10:
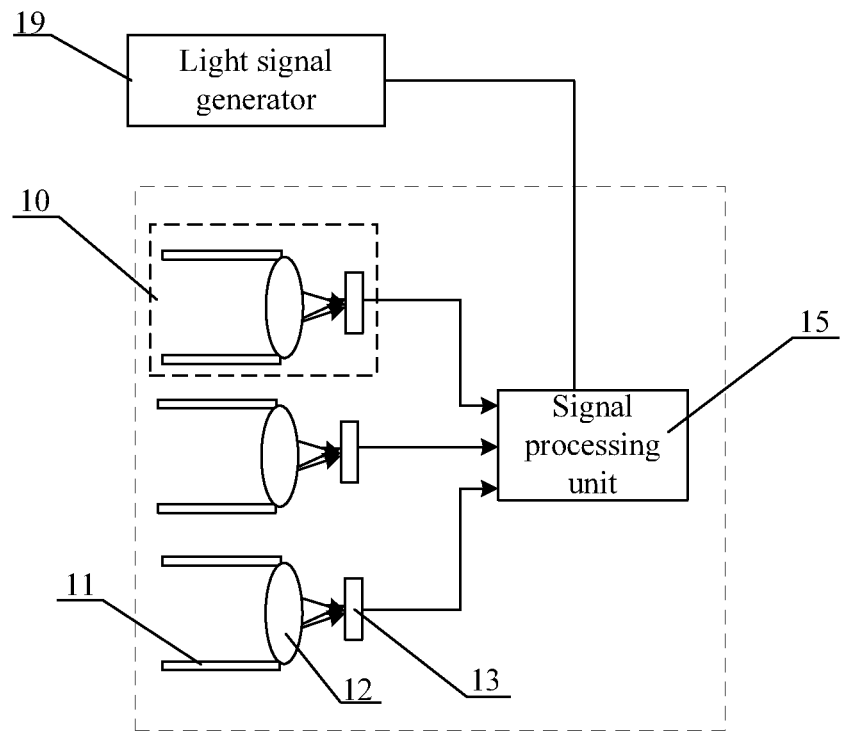
FIG. 10 is a second schematic structural diagram of an image shooting apparatus with an in-depth image shooting function according to Embodiment 2 of the present invention.

Further, this embodiment further provides an image shooting apparatus. As shown in FIG. 9 and FIG. 10, besides the foregoing components, the image shooting apparatus further includes at least one light signal generator 19, connected to the signal processing unit 15, where, as shown in FIG. 9, the light signal generator 19 is disposed in the image shooting array, formed by the image shooting units 10, in the image shooting apparatus, or as shown in FIG. 10, is disposed on an external perimeter of the image shooting apparatus, so as to illuminate a shot object, where the light signal generator 19 is configured to emit specific light signals that have a specific time sequence and are distinct from ambient illumination light, the specific light signals emitted by the light signal generator 19 return after being reflected by the shot object, the image shooting units 10 in the image shooting array are configured to collect the specific light signals that return, and the signal processing unit 15 is further configured to calculate a time difference between emission and receiving of the specific light signals that return after being reflected, so as to obtain depth information of pixels.

Figure 11:
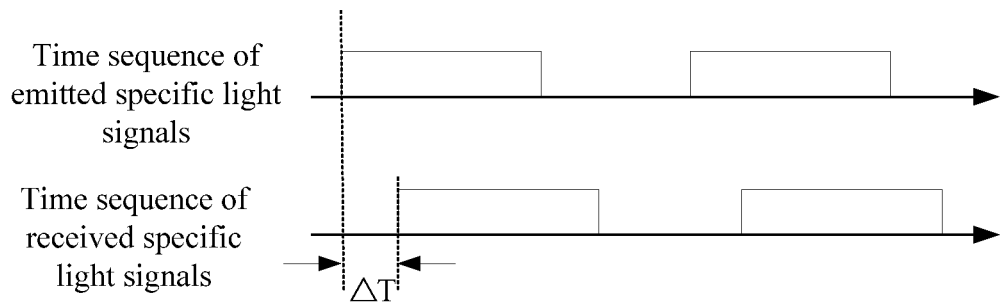
FIG. 11 is a schematic structural diagram of an image shooting unit in an image shooting apparatus according to Embodiment 2 of the present invention.

In this embodiment, the specific light signals emitted by the light signal generator 19 return after being reflected by the shot object, and the image shooting units are configured to collect the specific light signals that return, and actually parallel light in the specific light signals that return is collected. As shown in FIG. 11, the signal processing unit 15 compares a time sequence of specific light signals that return after being reflected with a time sequence of the emitted specific light signals to obtain a time difference between the emission and receiving of the specific light signals, and calculates location information of points of the shot object according to the time difference, thereby obtaining depth information of pixels (corresponding to points of the shot object).

If exact depth information of each pixel does not need to be known, image depth information collection does not need to be excessively detailed or dense. In this case, depth information collection may be performed in an interleave manner, that is, only depth information of one pixel among several neighboring pixels is collected and stored as depth information of these pixels. For example, in neighboring 2×2 pixels, only depth information of one pixel is collected and is stored as depth information of the four pixels.

Optionally, the light signal generator 19 is disposed on an external perimeter of the image shooting apparatus or is disposed in the image shooting array, formed by the image shooting units 10, in the image shooting apparatus, so as to illuminate the shot object. It does not matter where the light signal generator 19 is disposed, as long as it can be ensured that the specific light signals emitted by the light signal generator can reach the shot object and can enter the image shooting apparatus after being reflected by the shot object. To avoid affecting a shooting effect, the light signal generator 19 is usually disposed around an image shooting lens (the image shooting array formed by the image shooting units 10).

Optionally, the light signal generator 19 is a polarized light generator or an infrared light generator.

The image shooting apparatus in this embodiment obtains the depth information of pixels according to the time difference between the emission and receiving of the specific light signals to complete stereo (in-depth) image shooting, which can form point-by-point pixel depth information, so that a stereoscopic impression is stronger.

Figure 12:
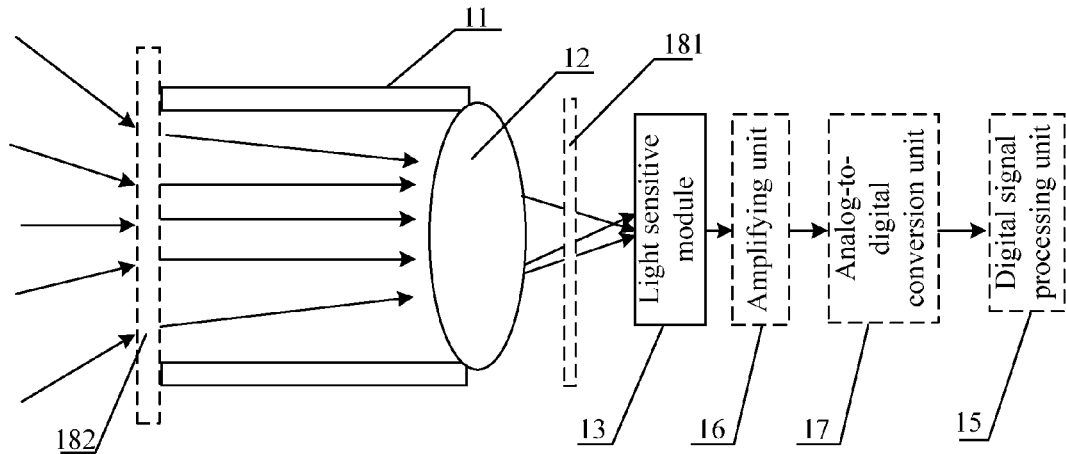
FIG. 12 is a schematic diagram of an in-depth image shooting principle according to Embodiment 2 of the present invention.

Optionally, as shown in FIG. 12, the image shooting unit further includes a light filtering optical component 181 configured to obtain the specific light signals emitted by the light signal generator by means of filtering, where the light filtering optical component 181 is disposed, facing incident light, in front of the light sensitive module 13, and light signals entering the image shooting unit fall on the light sensitive module 13 after the light filtering optical component 181 filters out the ambient illumination light. For example, the light filtering optical component 181 may be disposed in a location, as shown in FIG. 12, between the lens group 12 and the light sensitive module 13, or may be disposed in front of the tubular directional hood 11, or be disposed in a location between the tubular directional hood 11 and the lens group 12 or a location between the lens group 12 and the light sensitive module 13. The light filtering optical component 181 is configured to filter out other light signals, and reserves only the specific light signals emitted by the light signal generator, which eliminates an impact of the ambient illumination light. With the light filtering optical component 181 disposed, the light sensitive module 13 can receive only the specific light signals that are emitted by the light signal generator, which include the specific light signals that return after being reflected by the shot object, which can eliminate the impact of ambient illumination light signals on imaging.

If the light filtering optical component 181 is disposed on the image shooting apparatus, in an in-depth image shooting signal processing process, it should be noted that, when depth information is calculated according to a time difference, appropriate compensatory correction needs to be performed according to a thickness of the light filtering optical component 181 because a speed of light in air is different from that in the light filtering optical component 181.

Optionally, as shown in FIG. 12, the image shooting apparatus in this embodiment further includes a light converging component 182 configured to enlarge an angle of view of the image shooting apparatus, where the light converging component 182 is disposed, facing incident light, in front of the image shooting array, and the incident light enters the image shooting array after being converged by the light converging component 182, which can enlarge the angle of view of the image shooting apparatus and enable the image shooting apparatus to shoot a scene larger than the image shooting array.

There are two types, of light converging components 182, reflection type and transmission type. For a reflection-type light converging component, light rays converge on an image shooting apparatus after being reflected by the light converging component; and for a transmission-type light converging component, light rays enter an image shooting apparatus after being converged by the light converging component. The transmission-type light converging component may use a structure roughly similar to a telescope. Similarly, if a light converging component is disposed on the image shooting apparatus, in an in-depth image shooting signal processing process, it should be noted that appropriate compensatory correction needs to be performed according to a thickness of the light converging component.

It should be noted that, under a condition of no conflict, characteristics in this embodiment of the present invention can be arbitrarily and mutually combined.

In the image shooting apparatus in this embodiment, one of the multiple image shooting units collects one scene block, a light collection capability is appropriate, imaging quality is high, each scene block independently forms an image, there is no correlation between scene blocks, and the scene blocks do not have mutual impacts caused by dispersion and aberration phenomena; and signal processing is performed on signals collected by each image shooting unit to further eliminate impacts of dispersion and aberration, thereby improving image quality. The image shooting apparatus in this embodiment may further implement stereo (in-depth) image shooting, and a stereoscopic impression is stronger.

Embodiment 3

Figure 13:
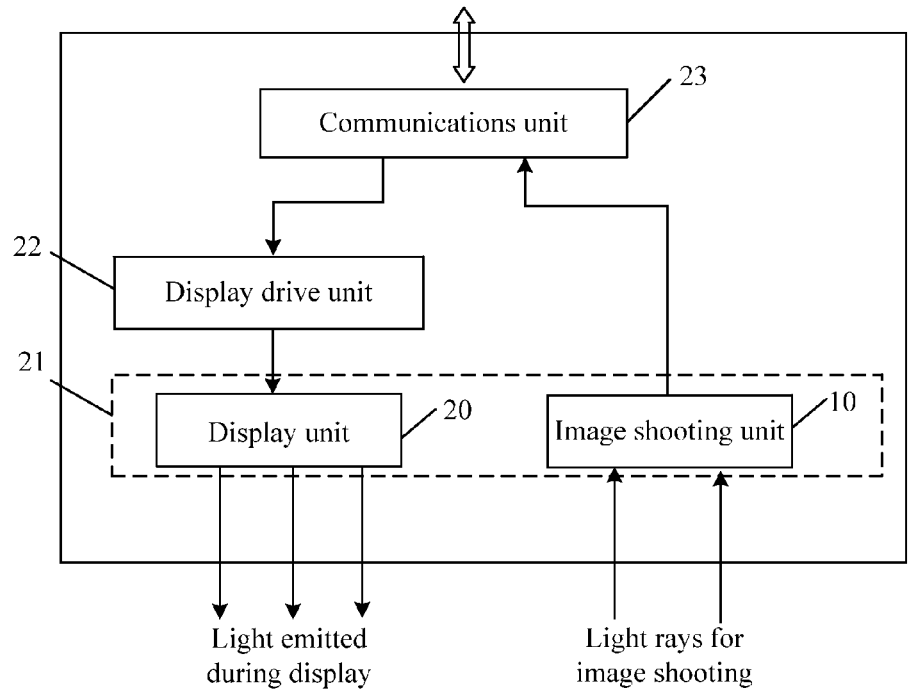
FIG. 13 is a first structural block diagram of an integrated display and image shooting apparatus according to Embodiment 3 of the present invention.
Figure 14:
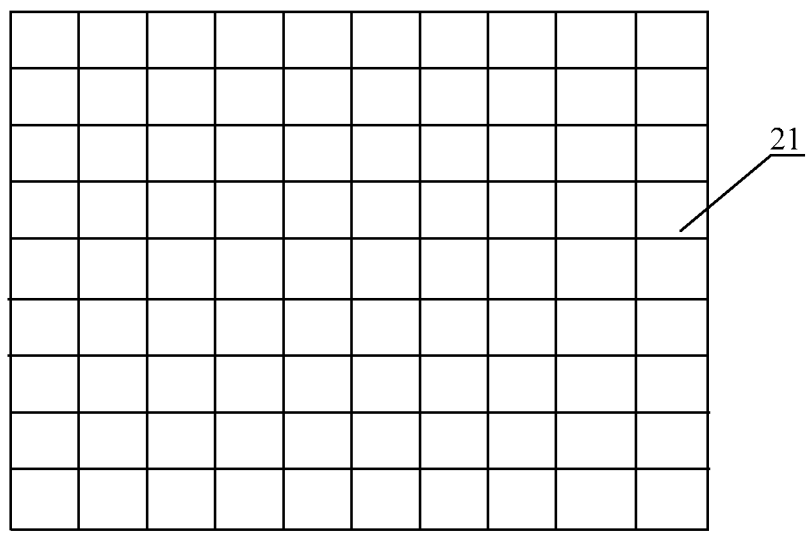
FIG. 14 is a schematic structural diagram of an integrated display and image shooting apparatus according to Embodiment 3 of the present invention.
Figure 15:
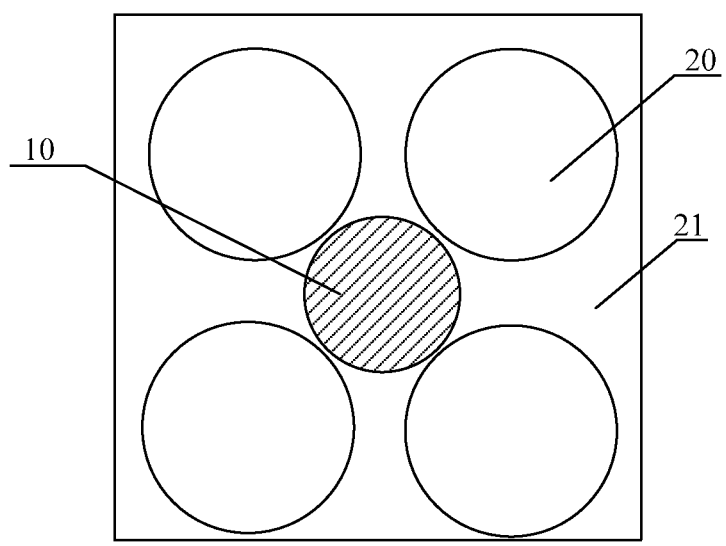
FIG. 15 is a schematic diagram of an internal structure of one integrated display and image shooting unit according to Embodiment 3 of the present invention.

As shown in FIG. 13, this embodiment of the present invention provides an integrated display and image shooting apparatus, where the apparatus includes as shown in FIG. 14, A×B integrated display and image shooting units 21 arranged in an array manner, a communications unit 23, and a display drive unit 22, where both A and B are non-zero natural numbers, and as shown in FIG. 15, the integrated display and image shooting unit 21 includes one of the multiple image shooting units 10 and several display units 20, the image shooting unit and the display units are disposed on a same plane, one display unit 20 includes one display pixel, and the image shooting units 10 are distributed in display pixels of a display, where all image shooting units 10 of the integrated display and image shooting units collect image information; the communications unit 23 sends the collected image information to an external device or receives to-be-displayed image information sent by an external device; the display drive unit 22 converts the received to-be-displayed image information into display drive signals and loads the display drive signals to the display units 20; and all display units 20 of the integrated display and image shooting units 21 display images according to the loaded display drive signals.

In this embodiment, the image shooting unit 10 includes a tubular directional hood, a lens group, and a light sensitive module that are arranged sequentially along a light incidence direction and a same optical axis. Preferably, one integrated display and image shooting unit 21 in this embodiment includes one of the multiple image shooting units 10 and one display unit 20, and one display unit 20 includes one display pixel; and further preferably, one of the multiple image shooting units 10 collects one pixel, that is, one single-pixel image shooting unit 10 is disposed in an area of one display pixel.

Certainly, one integrated display and image shooting unit 21 may also include one of the multiple image shooting units 10 and several display units 20. One of the multiple image shooting units 10 is disposed in a contiguous area of several display pixels. The image shooting unit 10 and the display units 20 are disposed on a same plane, so that a display can receive light signals to form an image while displaying an image, simultaneously implementing image shooting and display functions. In this embodiment, the image shooting units 10 are distributed in display pixels, and specific disposing locations are not limited by this embodiment. In the integrated display and image shooting unit 21 shown in FIG. 15, one of the multiple image shooting units 10 is disposed in an area of 2×2 pixels.

The image shooting units 10 are arranged in an array manner on a display and are distributed in an interleave manner in display pixels of the display, all image shooting units 10 jointly form an image shooting apparatus and are configured to collect image information, and the communications unit 23 sends the collected image information to an external device; on the other hand, the communications unit 23 is further configured to receive to-be-displayed image information sent by an external device, the display drive unit 22 converts the received to-be-displayed image information into display drive signals and loads the display drive signals to the display units 20, and all display units 20 jointly form the display and display images according to the loaded display drive signals.

For the integrated display and image shooting apparatus according to this embodiment, the display receives light signals to form an image while displaying an image and may simultaneously implement the image shooting and display functions. Because the image shooting units 10 are distributed in an interleave manner in display pixels, during remote video communication, a problem of an oblique angle of view existing between two communication parties during telepresence in the prior art can be solved using the integrated display and image shooting apparatus. The integrated display and image shooting apparatus provides an effect similar to that two communication parties meet each other using a completely transparent glass-type medium, improves an image display effect in a remote video communication process, and may be configured to form a mirror telepresence module and be applied to remote video communication.

This embodiment further provides another integrated display and image shooting apparatus, which also includes an integrated display and image shooting unit 21, a communications unit 23, and a display drive unit 22, where a difference from the integrated display and image shooting apparatus described above lies in that, as shown in FIG. 16, the integrated display and image shooting unit 21 includes a display unit 20 and the image shooting unit 10 described in Embodiment 1, and the image shooting unit 10 and the display unit 20 are arranged in a disassociated manner on a same plane. One display unit 20 includes one display pixel, and a working process is roughly similar, where the image shooting units 10 of the integrated display and image shooting units 21 collect image information; the communications unit 23 sends the collected image information to an external device or receives to-be-displayed image information sent by an external device; the display drive unit 22 converts the received to-be-displayed image information into display drive signals and loads the display drive signals to the display units; and the display units 20 of the integrated display and image shooting units 21 display images according to the loaded display drive signals.

Figure 16:
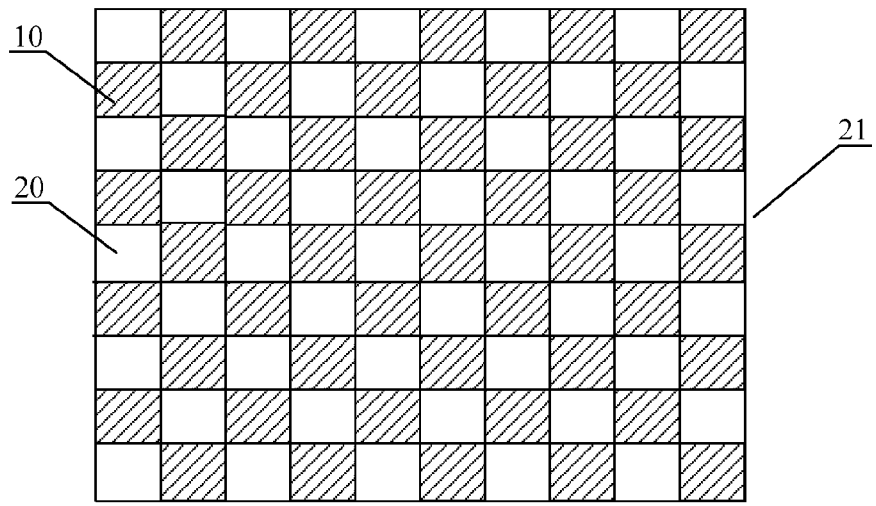
FIG. 16 is a schematic structural diagram of another integrated display and image shooting apparatus according to Embodiment 3 of the present invention.

FIG. 16 only shows a specific implementation manner of the integrated display and image shooting unit 21 in this embodiment. During specific implementation, the image shooting unit 10 and the display unit 20 may be arranged in various promiscuous manners, and a working process is roughly similar, which is not limited herein by this embodiment.

The integrated display and image shooting apparatus according to this embodiment can also solve a problem of an oblique angle of view existing between two communication parties during telepresence in the prior art. The integrated display and image shooting apparatus provides an effect similar to that two communication parties meets each other using a completely transparent glass-type medium, improves an image display effect in a remote video communication process, and may be configured to form a mirror telepresence module and be applied to remote video communication.

Figure 17:
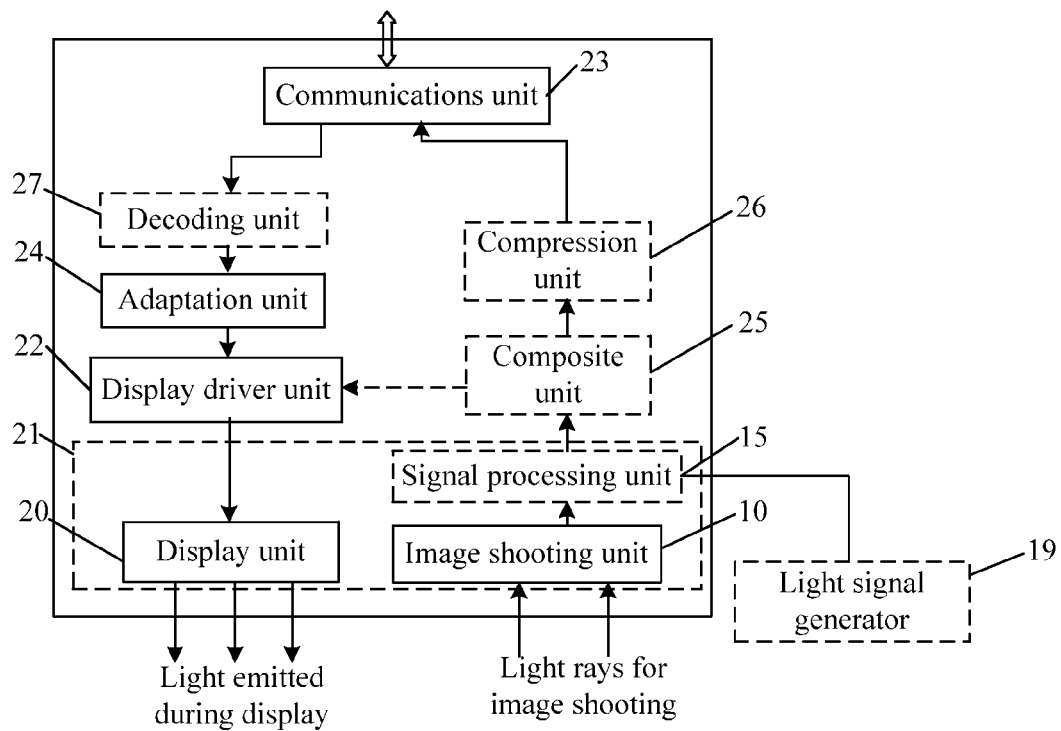
FIG. 17 is a second structural block diagram of an integrated display and image shooting apparatus according to Embodiment 3 of the present invention.

Further, as shown in FIG. 17, each integrated display and image shooting apparatus described in the foregoing embodiment may further include an adaptation unit 24, disposed between the communications unit 23 and the display drive unit 22, separately connected to the communications unit 23 and the display drive unit 22, and configured to, when the to-be-displayed image information received by the communications unit 23 does not adapt to the display unit 20, perform adaptation processing on the to-be-displayed image information to convert the received to-be-displayed image information into information that is suitable for display by the display unit 20.

All the display units 20 form a display of the integrated display and image shooting apparatus. When the to-be-displayed image information received by the communications unit 23 may not adapt to the display, specific image pixel adaptation needs to be performed on the to-be-displayed image information, so that the to-be-displayed image information is adapted to form an image that is suitable for display by the display units 20, and circuit drive is also performed before the display, then electrical signals are converted into light signals for display by means of working of a light-emitting dot matrix circuit. For a specific display manner, the following various displays may be used for display: a Light Emitting Diode (LED) display, a Plasma Display Panel (PDP) display, a Liquid Crystal Display (LCD) display, electroluminescence, and the like, which is not limited by the present invention. For a specific adaptation process of the adaptation unit 24, there are various processing technologies, which belong to the prior art, and details are not repeatedly described herein.

Further, as shown in FIG. 17, each integrated display and image shooting apparatus described in the foregoing embodiment may further include at least one signal processing unit 15, connected to the image shooting unit 10, and configured to filter electrical signals output by light sensitive points on the light sensitive module 13 of the image shooting unit 10 to obtain electrical signals corresponding to direct parallel light, and convert the obtained electrical signals corresponding to the direct parallel light into one or several pixels, where one signal processing unit 15 is connected to the light sensitive module 13 of one of the multiple image shooting units 10; or one signal processing unit 15 is connected to the light sensitive modules 13 of multiple image shooting units 10, and the multiple image shooting units 10 share the one signal processing unit 15.

The signal processing unit 15 in this embodiment is configured to obtain electrical signals corresponding to direct parallel light (electrical signals corresponding to direct light) by means of filtering to further reduce interference of stray light and improve an imaging effect of the integrated display and image shooting apparatus.

Optionally, as shown in FIG. 17, each integrated display and image shooting apparatus described in the foregoing embodiment may further include a composite unit 25, connected to the image shooting unit 10 or the signal processing unit, and configured to combine the image information collected by the image shooting unit 10 or image information output by the signal processing unit into a complete image.

The image information collected by the image shooting units 10 in this embodiment includes location information, for example, image information corresponding to a location is formed according to a corresponding image shooting unit 10 that collects a piece of corresponding image information data and according to a specific light sensitive point, on the light sensitive module of the image shooting unit 10, at which the image information is converted into electrical signals. The image information may be recorded using an array. Therefore, the image information collected by the image shooting units 10 may be directly used for display, without being combined, and may be directly displayed in a one-to-one correspondence on display units in corresponding locations at a display end according to the location information, and a complete image is finally displayed; or the composite unit 25 may be used to combine the collected image information into a complete image first, and then the communications unit 23 is used to send the complete image to an external device, so as to reduce a data volume during transmission. The composite unit 25 combines image information collected by the image shooting units into a complete image according to location information included in the image information, and then uses a conventional technical means to store and transmit the composite complete image.

Optionally, the integrated display and image shooting apparatus in this embodiment may further include a compression unit 26, connected to the signal processing unit 15 or the composite unit 25, and configured to perform data compression on the image information output by the signal processing unit 15 or the complete image combined by the composite unit 25, so as to reduce a data volume during transmission. When compression is performed, a series of compression algorithms such as Moving Picture Experts Group (MPEG)-1/2/4/7 and compression algorithms such as H.263/H.264/H.265 may be used, which is not limited by the present invention.

Optionally, the integrated display and image shooting apparatus in this embodiment may further include a decoding unit 27, connected to the communications unit, and configured to, when the to-be-displayed image information received by the communications unit is compressed data, perform decoding processing on the received compressed data.

Further, the integrated display and image shooting apparatus in this embodiment may further include a control unit, connected to the display drive unit 22, and configured to generate self-loop control information according to a self-loop display instruction of a user.

According to the self-loop control information, the display drive unit 22 converts the image information collected by the image shooting unit or the complete image combined by the composite unit 25 into display drive signals and load the display drive signals to the display units 20.

When the integrated display and image shooting apparatus needs to perform self-test, or in another case in which an image shot by the apparatus itself needs to be viewed, the control unit generates self-loop control information according to a self-loop display instruction of a user, and the display drive unit 22 receives the self-loop control information, converts image information collected by the image shooting unit or a complete image combined by the composite unit 25 into display drive signals, and loads the display drive signals to the display units 20. An image shot by the integrated display and image shooting apparatus itself is viewed in real time.

In conclusion, the integrated display and image shooting apparatus in this embodiment includes two parallel systems, namely, image shooting and display systems, and can simultaneously implement image shooting and display functions, form a mirror telepresence module, and be used for remote video communication. The integrated display and image shooting apparatus according to this embodiment can eliminate impacts of dispersion and aberration on imaging, solves a problem of an oblique angle of view existing between two communication parties, improves image quality, and can further implement stereo (in-depth) image shooting.

A person skilled in the art can easily modify and extend the integrated display and image shooting apparatus in this embodiment within the technical scope disclosed in the present invention, for example, as shown in FIG. 17, the integrated display and image shooting apparatus may further include at least one light signal generator 19, connected to the signal processing unit 15, where the light signal generator 19 is disposed on an external perimeter of the integrated display and image shooting apparatus or is disposed in the array, formed by the integrated display and image shooting units, in the integrated display and image shooting apparatus, so as to illuminate a shot object, where the light signal generator 19 is configured to emit light signals that have a specific time sequence and are distinct from ambient illumination light, the specific light signals emitted by the light signal generator 19 return after being reflected by the shot object, the image shooting unit is configured to collect the specific light signals that return, and the signal processing unit 15 is further configured to calculate a time difference between emission and receiving of the specific light signals that return after being reflected, so as to obtain depth information of pixels.

Optionally, referring to FIG. 12, the image shooting apparatus may further include a light converging component 182 configured to enlarge an angle of view of the image shooting apparatus, where the light converging component 182 is disposed, facing incident light, in front of image shooting units, and the incident light enters the image shooting units after being converged by the light converging component 182. The incident light is converged first and then enters the image shooting units for imaging, which can enlarge the angle of view of the image shooting apparatus.

The integrated display and image shooting apparatus according to this embodiment can simultaneously implement image shooting and display functions, form a mirror telepresence module, and be used for remote video communication. The integrated display and image shooting apparatus according to this embodiment can eliminate impacts of dispersion and aberration on imaging, solves a problem of an oblique angle of view existing between two communication parties, improves image quality, and can further implement stereo (in-depth) image shooting.

Embodiment 4

Figure 18:
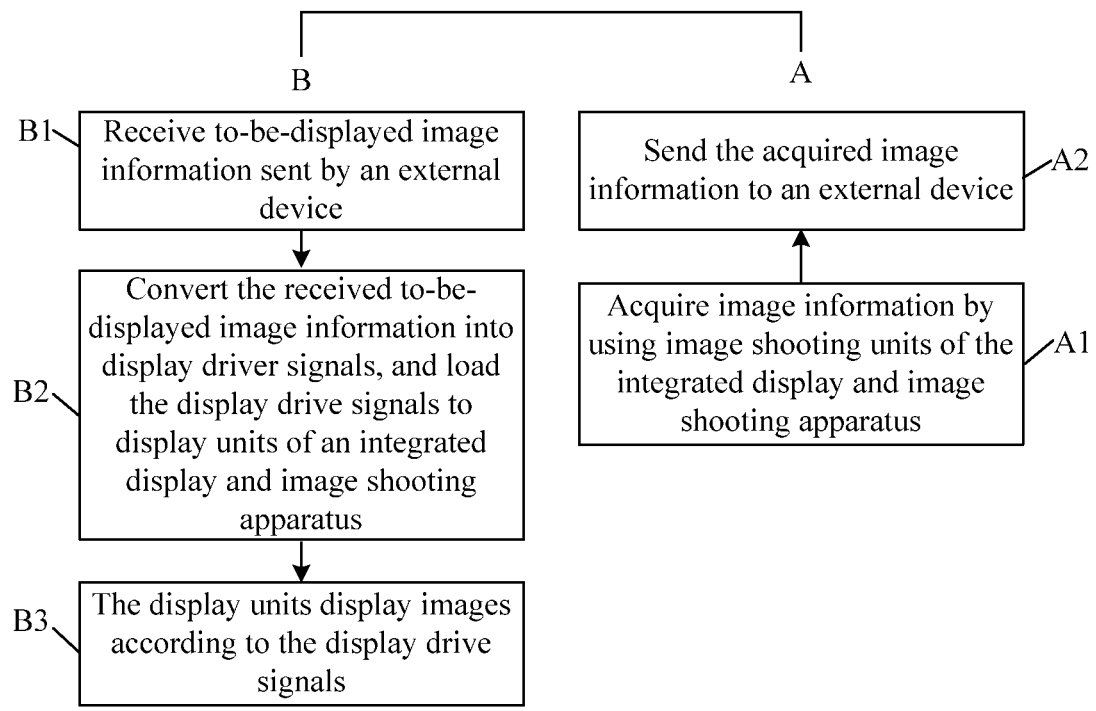
FIG. 18 is a first schematic flowchart of a video image processing method according to Embodiment 4 of the present invention.

Based on the integrated display and image shooting apparatus according to Embodiment 3, as shown in FIG. 18, this embodiment further provides a video image processing method, including two parts A and B that may be concurrently executed.

A: Perform image shooting, acquire image information, and send the image information to an external device, including:

Step A1: Acquire the image information using image shooting units of the integrated display and image shooting apparatus.

Step A2: Send the acquired image information to the external device.

B: Receive image information sent by an external device, including:

Step B1: Receive to-be-displayed image information sent by the external device.

Step B2: Convert the received to-be-displayed image information into display drive signals, and load the display drive signals to display units of the integrated display and image shooting apparatus.

Step B3: The display units display images according to the display drive signals.

The video image processing method in this embodiment is based on the integrated display and image shooting apparatus. In one aspect, to-be-displayed images are displayed on the display units of the integrated display and image shooting apparatus, and in another aspect, image information is acquired using the image shooting units of the integrated display and image shooting apparatus, which can simultaneously implement display and image shooting functions, can further thoroughly solve a problem of an oblique angle of view existing between two communication parties during telepresence in the prior art, really implements "eye-to-eye" in a remote video communication process, improves an image display effect in the remote video communication process, and may be configured to form a mirror telepresence module.

Figure 19:
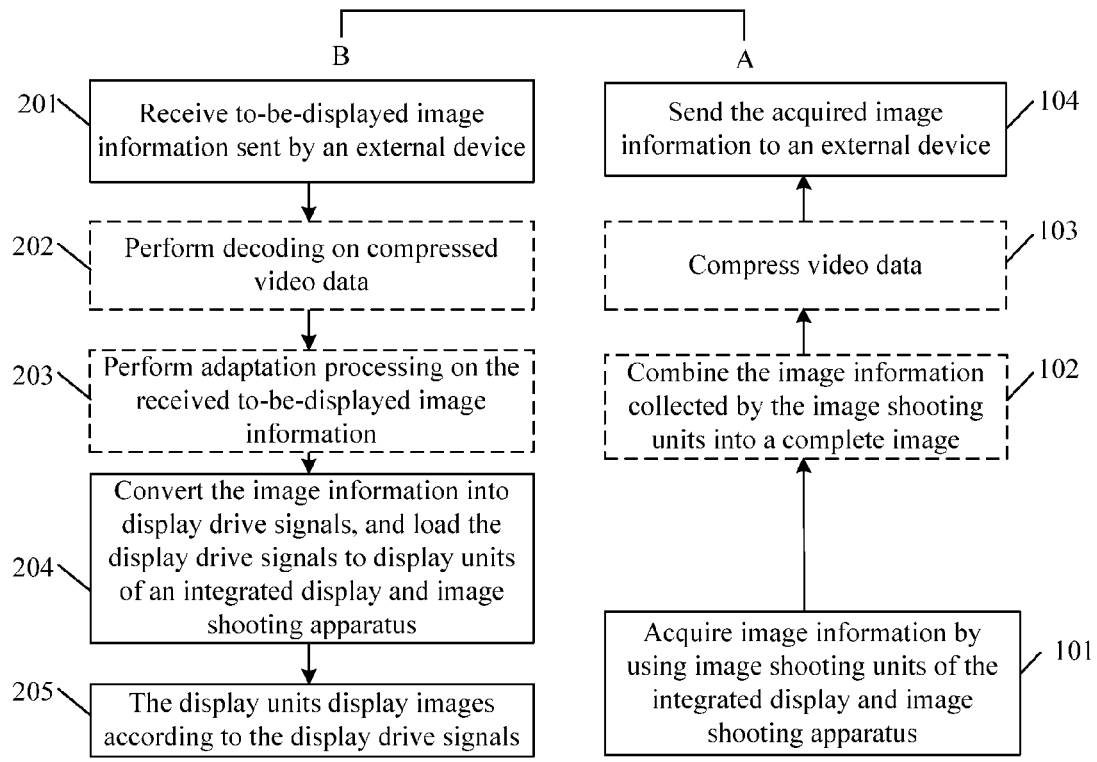
FIG. 19 is a second schematic flowchart of a video image processing method according to Embodiment 4 of the present invention.

Further, as shown in FIG. 19, besides the (corresponding to A1, A2, B1, B2, and B3 described in FIG. 18), when the to-be-displayed image information received by the communications unit adapts to none of the display units, the video image processing method further includes:

Step 203: Perform adaptation processing on the received to-be-displayed image information, so as to convert the received to-be-displayed image information into information that is suitable for display by the display units in the integrated display and image shooting apparatus.

Optionally, before the sending the acquired image information to an external device, the method may further include:

Step 102: Combine the image information collected by the image shooting units into a complete image, so as to reduce a data volume, thereby saving storage space and reducing a data transmission volume.

Optionally, before the sending the acquired image information to an external device, the method may further include:

Step 103: Perform data compression on the image information acquired by the image shooting units or the complete image information formed by combination, so as to reduce a data transmission volume.

Step 103 and step 104 may be in a sequential relationship, or may be in a parallel relationship.

Optionally, when the received to-be-displayed image information is compressed data, the method may further include:

Step 202: Perform decoding on the received compressed data.

Further, the video image processing method further includes generating self-loop control information according to a self-loop display instruction of a user, converting, according to the self-loop control information, the image information collected by the image shooting units or the complete image formed by combination into display drive signals, and loading the display drive signals to the display units of the integrated display and image shooting apparatus.

The video image processing method in this embodiment is based on the integrated display and image shooting apparatus in this embodiment, implements mirror display and image shooting functions, thoroughly solves a problem of an oblique angle of view existing between two communication parties during telepresence in the prior art, really implements "eye-to-eye" in a remote video communication process, improves an image display effect in the remote video communication process, and may be configured to form a mirror telepresence module.

Embodiment 5

This embodiment of the present invention provides an image shooting method described as follows: shooting, by each image shooting unit of an image shooting apparatus, a shot scene simultaneously; and collecting, by each image shooting unit, using its respective tubular directional hood, parallel light signals of the shot scene separately to obtain an image of a scene block in the shot scene, where the images shot by the image shooting units are combined to form a complete image and the image shot by each image shooting unit corresponds to one or several pixels of the complete image.

According to the image shooting method in this embodiment, each scene block independently forms an image, and there is no correlation between scene blocks, and therefore the scene blocks do not have mutual impacts caused by dispersion and aberration phenomena, thereby improving image quality.

Figure 20:
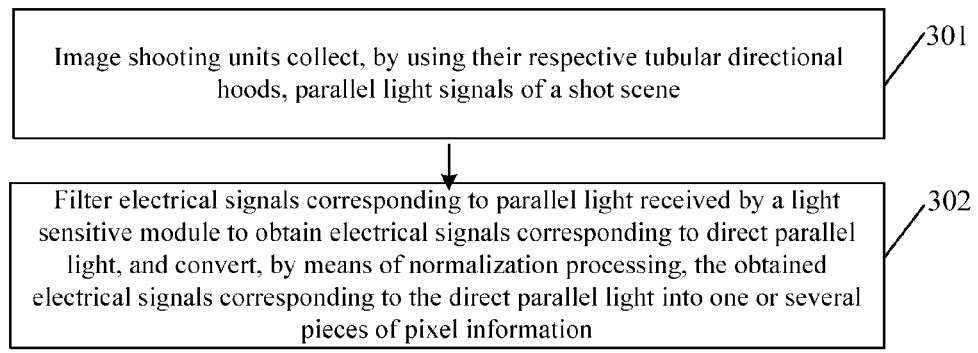
FIG. 20 is a schematic flowchart of an image shooting method according to Embodiment 5 of the present invention.

As shown in FIG. 20, the image shooting method in this embodiment includes:

Step 301: The image shooting units collect, using their respective tubular directional hoods, the parallel light signals of the shot scene.

Step 302: Filter electrical signals corresponding to parallel light received by light sensitive points of a light sensitive module to obtain electrical signals corresponding to direct parallel light, and convert, by means of normalization processing, the obtained electrical signals corresponding to the direct parallel light into one or several pixels.

In this embodiment of the present invention, signal collection is separately performed on the shot scene by scene block, and during storage, electrical signals corresponding to parallel light collected by each image shooting unit is stored as one or several pixels, and when the pixel information is displayed again, pixels are combined, according to predetermined arrangement, into a complete image for playing by frame.

According to the image shooting method in this embodiment, each scene block independently forms an image, there is no correlation between scene blocks, and therefore the scene blocks do not affect have mutual impacts caused by dispersion and aberration phenomena; and signal processing is performed on signals collected by each image shooting unit to further eliminate impacts of dispersion and aberration, thereby improving image quality.

It should be noted that, under a condition of no conflict, characteristics in the embodiments of the present invention can be arbitrarily and mutually combined.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are only specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image shooting unit that performs collection based on pixels, wherein the image shooting unit is configured to collect image information, wherein a formed image is a pixel block comprising one or several pixels, and wherein the image shooting unit comprises:
   a tubular directional hood;
   a lens group; and
   a light sensitive module that is arranged sequentially along a light incidence direction and a same optical axis,
   wherein the light sensitive module comprises a plurality light sensitive components arranged in an array manner to form a light sensitive matrix,
   wherein the tubular directional hood eliminates non-parallel light signals entering the tubular directional hood and enables parallel light signals parallel to an axis of the tubular directional hood to pass,
   wherein the lens group converges onto the light sensitive module,
   wherein the parallel light signals passes through the tubular directional hood, and
   wherein the light sensitive module converts the parallel light signals into electrical signals.

2. The image shooting unit according to claim 1, wherein a material of the tubular directional hood is a light-absorbing material, and wherein the non-parallel light signals entering the tubular directional hood travel to the inner wall of the tubular directional hood and are absorbed by the light-absorbing material.

3. The image shooting unit according to claim 1, wherein an inner wall of the tubular directional hood is coated with a light-absorbing material, and wherein the non-parallel light signals entering the tubular directional hood travel to the inner wall of the tubular directional hood and are absorbed by the light-absorbing material.

4. The image shooting unit according to claim 1, wherein the lens group is affixed against a light signal outgoing end of the tubular directional hood, and wherein the tubular directional hood encircles an edge of the lens group to form a tubular light ray path.

5. An image shooting apparatus comprising:
   multiple image shooting units that perform collection based on pixels, wherein the image shooting units are configured to collect image information, wherein a formed image is a pixel block comprising one or several pixels, and wherein the image shooting units comprise:
      a tubular directional hood;
      a lens group; and
      a light sensitive module that is arranged sequentially along a light incidence direction and a same optical axis,
   wherein the tubular directional hood eliminates non-parallel light signals entering the tubular directional hood and enables parallel light signals parallel to an axis of the tubular directional hood to pass,
   wherein the lens group converges onto the light sensitive module,
   wherein the parallel light signals pass through the tubular directional hood,
   wherein the light sensitive module converts the parallel light signals into electrical signals,
   wherein the image shooting units are arranged in an array manner to form an N×M image shooting array,
   wherein both N and M are non-zero natural numbers,
   wherein each image shooting unit uses its respective tubular directional hood to shoot a scene block in a shot scene,
   wherein each scene block independently forms an image,
   wherein the scene blocks shot by the multiple image shooting units are combined to form a complete image, and
   wherein each scene block corresponds to one or several pixels in the complete image.

6. The apparatus according to claim 5 further comprising at least one processor configured to:
   filter electrical signals output by light sensitive points on the light sensitive module to obtain electrical signals corresponding to direct parallel light; and
   convert the obtained electrical signals into one or several pixels,
   wherein one processor is connected to the light sensitive module of one of the multiple image shooting units.

7. The apparatus according to claim 6, wherein the processor is further configured to:
   perform a correlation calculation on the electrical signals output by the light sensitive points on the light sensitive module; and
   filter, according to a result of the correlation calculation, the electrical signals corresponding to the parallel light received by the light sensitive module to obtain the electrical signals corresponding to the direct parallel light; and
   convert, using normalization processing, the obtained electrical signals corresponding to the direct parallel light into the one or several pixels.

8. The apparatus according to claim 6 further comprising:
   an amplifier connected to the light sensitive module and configured to amplify the electrical signals output by the light sensitive module; and
   an analog-to-digital converter connected to the amplifier and configured to convert the amplified electrical signals into digital signals, wherein the processor is a digital processor, is connected to one or several analog-to-digital converters, and is configured to:
- perform correlation calculation on the digital signals output by the analog-to-digital converter;
- obtain, by filtering according to a result of the correlation calculation, the electrical signals corresponding to the direct parallel light; and
- convert the obtained electrical light sensitive module signals corresponding to the direct parallel light into one or several pixels.

9. The apparatus according to claim 6 further comprising at least one light signal generator connected to the processor, wherein the light signal generator is disposed in the image shooting array, formed by the image shooting units, in the image shooting apparatus or is disposed on an external perimeter of the image shooting apparatus, so as to illuminate a shot object, wherein the light signal generator is configured to emit specific light signals that have a specific time sequence and are distinct from ambient illumination light, wherein the specific light signals return after being reflected by the shot object, wherein the image shooting units in the image shooting array are configured to collect the specific light signals that return, and wherein the processor is further configured to calculate a time difference between emission and receiving of the specific light signals that return after being reflected, so as to obtain depth information of the pixels.

10. The apparatus according to claim 9, wherein the light signal generator is a polarized light generator or an infrared light generator.

11. The apparatus according to claim 9, wherein the image shooting unit further comprises a light filtering optical component configured to obtain, by filtering, the specific light signals emitted by the light signal generator and disposed, facing incident light, in front of the light sensitive module, and wherein light signals entering the image shooting unit fall on the light sensitive module after the light filtering optical component filters out the ambient illumination light.

12. The apparatus according to claim 5 further comprising a light converging component configured to enlarge an angle of view of the image shooting apparatus, wherein the light converging component is disposed, facing incident light, in front of the image shooting array, and wherein an incident light beam enters the image shooting array after being converged by the light converging component.

13. The image shooting unit according to claim 1, wherein the light sensitive components are complementary metal-oxide-semiconductor components.

14. The image shooting unit according to claim 1, wherein the light sensitive components are charge-coupled device components.

15. The image shooting unit according to claim 1, wherein the light sensitive components are configured to perform sampling on an optical spot.

16. The image shooting unit according to claim 1, wherein the light sensitive components are configured to convert the parallel light signals into electrical signals based on amplitudes of the light signals.

17. The apparatus according to claim 5 further comprising at least one processor configured to:
- filter electrical signals output by light sensitive points on a light sensitive module to obtain electrical signals corresponding to direct parallel light; and
- convert the obtained electrical signals into one or several pixels,
- wherein one processor is connected to the light sensitive modules of the multiple image shooting units, and
- wherein the multiple image shooting units share the one processor.

18. The apparatus according to claim 5, wherein the light sensitive components are complementary metal-oxide-semiconductor components.

19. The apparatus according to claim 5, wherein the light sensitive components are charge-coupled device components.

20. The apparatus according to claim 5, wherein the light sensitive components are configured to convert the parallel light signals into electrical signals based on amplitudes of the light signals.

* * * * *